United States Patent
Shin

(10) Patent No.: US 7,699,942 B2
(45) Date of Patent: Apr. 20, 2010

(54) DISH WASHER AND DRAIN HOSE FIXING ASSEMBLY THEREOF

(75) Inventor: Kap Soo Shin, Cheongjoo-si (KR)

(73) Assignee: LG Electronics Inc., Seoul (KR)

( * ) Notice: Subject to any disclaimer, the term of this patent is extended or adjusted under 35 U.S.C. 154(b) by 483 days.

(21) Appl. No.: 10/575,954

(22) PCT Filed: Aug. 9, 2005

(86) PCT No.: PCT/KR2005/002587

§ 371 (c)(1),
(2), (4) Date: Apr. 13, 2006

(87) PCT Pub. No.: WO2006/036039

PCT Pub. Date: Apr. 6, 2006

(65) Prior Publication Data

US 2009/0139552 A1   Jun. 4, 2009

(30) Foreign Application Priority Data

Aug. 16, 2004   (KR) ...................... 10-2004-0064198

(51) Int. Cl.
*B08B 3/00* (2006.01)
(52) U.S. Cl. ................. 134/56 D; 134/57 D; 134/58 D; 68/12.01
(58) Field of Classification Search ............... 134/56 D, 134/57 D, 58 D; 68/12.01
See application file for complete search history.

(56) References Cited

U.S. PATENT DOCUMENTS

| 5,312,138 A | 5/1994 | Patera et al. |
| 2004/0154348 A1* | 8/2004 | Kim et al. ................... 68/12.01 |
| 2007/0101774 A1* | 5/2007 | Lee .............................. 68/208 |

FOREIGN PATENT DOCUMENTS

| JP | 50-65279 U | | 6/1975 |
| JP | 51-90661 U | | 7/1976 |
| JP | 07-265582 A | | 10/1995 |
| KR | 20-341842 Y1 | | 2/2004 |
| KR | 10-2004-0023108 | * | 3/2004 |
| KR | 10-2004-23108 | | 3/2004 |

OTHER PUBLICATIONS

International Search Report dated Nov. 17, 2005.

* cited by examiner

*Primary Examiner*—Michael Barr
*Assistant Examiner*—Jason Heckert
(74) *Attorney, Agent, or Firm*—McKenna Long & Aldridge LLP

(57) ABSTRACT

A drain hose fixing assembly of a dishwasher includes a holder body provided at an outer circumference with at least one hook and an interference preventing rib formed on an inner circumference of the holder body to prevent a drain hose from interfering with the hook.

18 Claims, 3 Drawing Sheets

[Fig. 1]
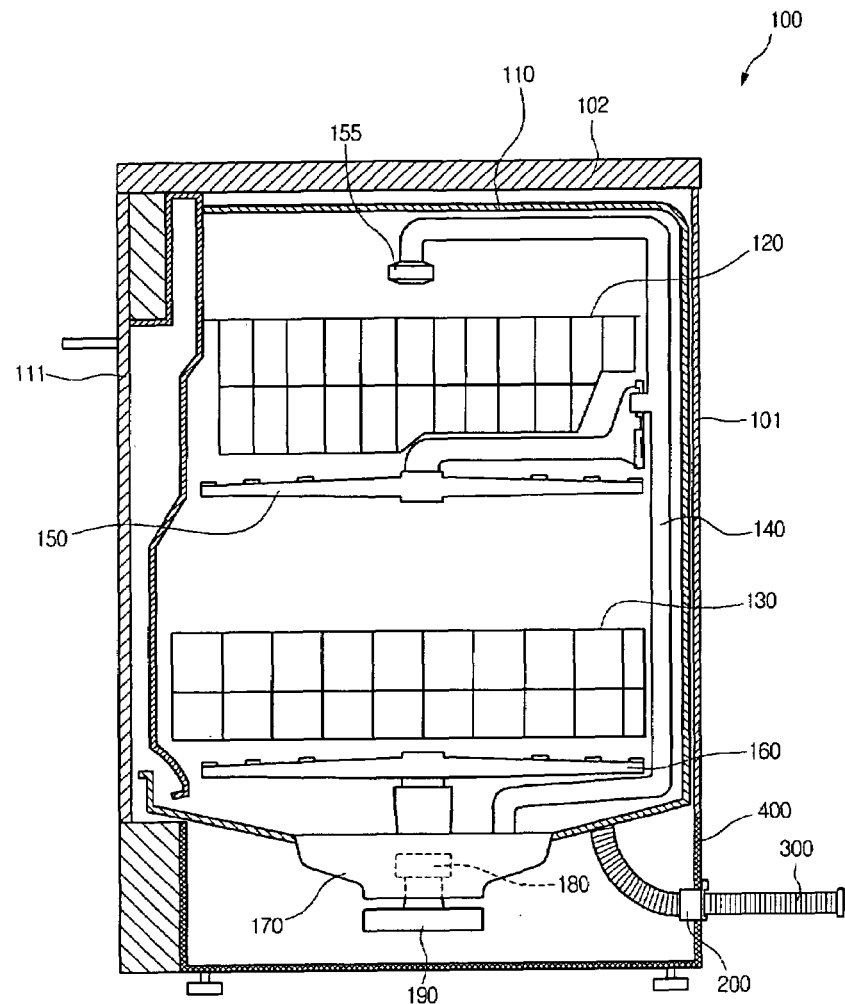
[Fig. 2]
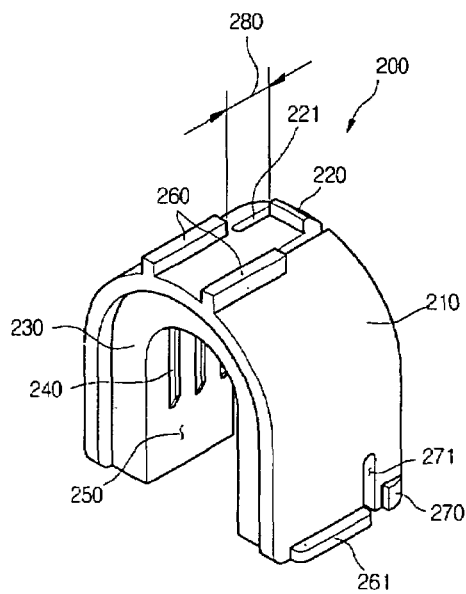

[Fig. 3]
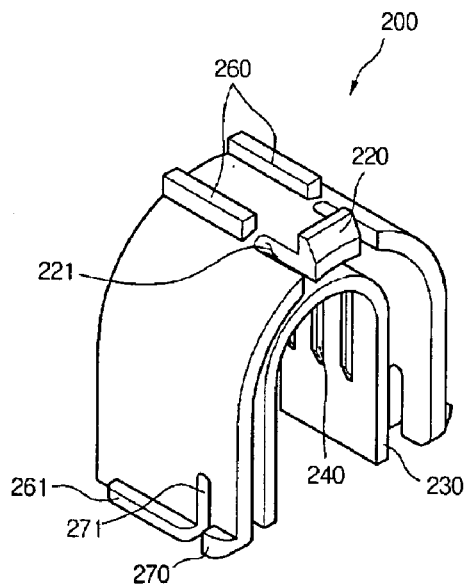
[Fig. 4]
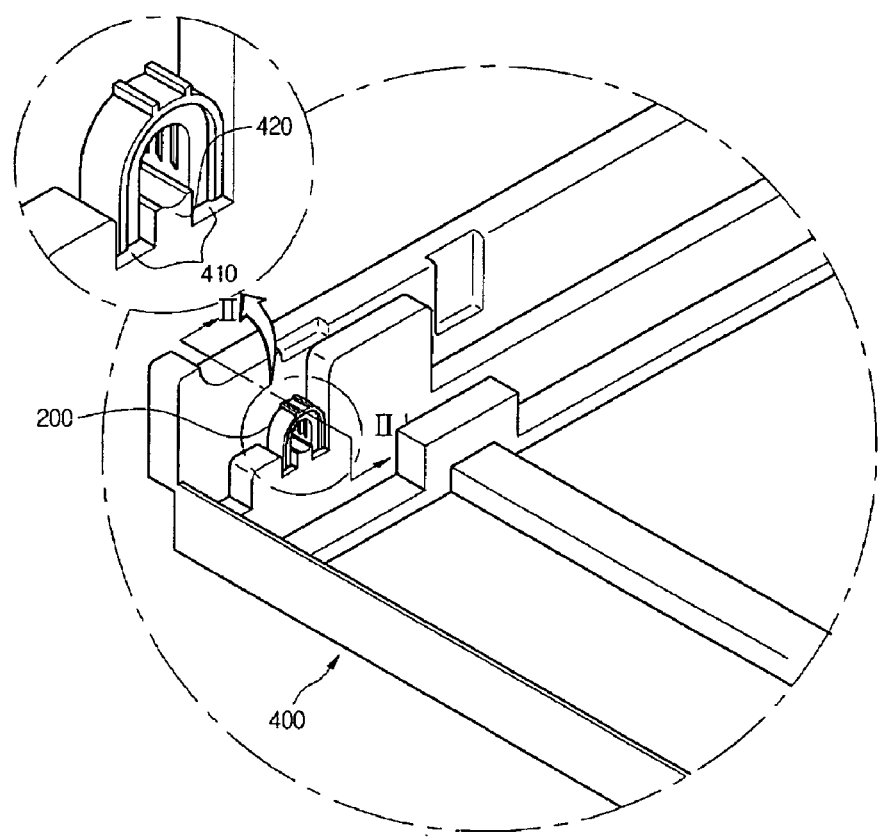

[Fig. 5]
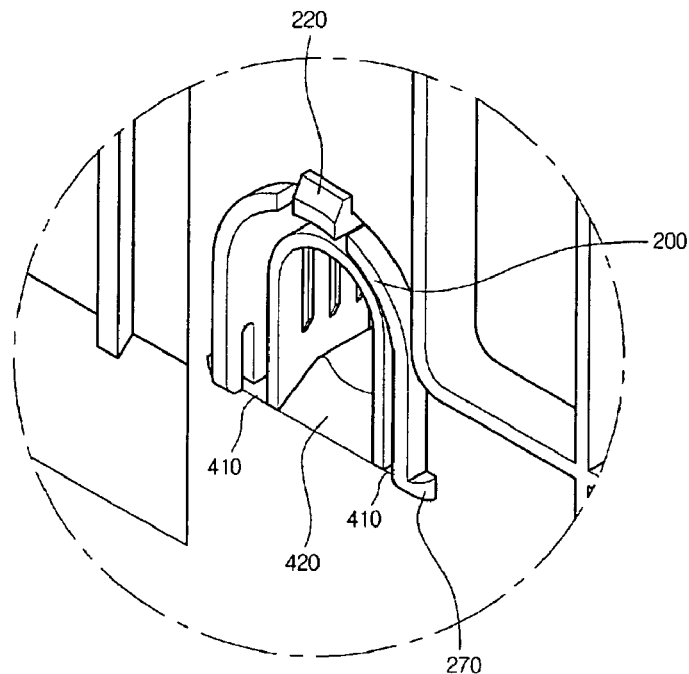
[Fig. 6]
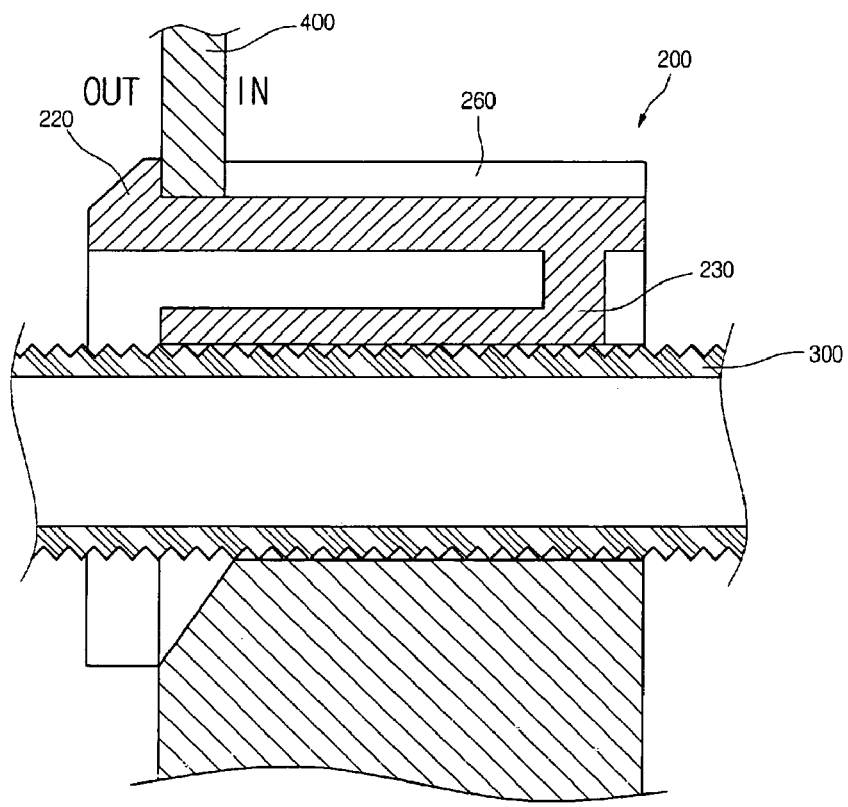

DISH WASHER AND DRAIN HOSE FIXING ASSEMBLY THEREOF

This application claims priority to International application No. PCT/KR2005/002587 filed on Aug. 9, 2005, Korean Application No. 10-2004-64198 filed on Aug. 16, 2004, both of which are incorporated by reference, as if fully set forth herein.

TECHNICAL FIELD

The present invention relates to a dishwasher, and more particularly, to a drain hose fixing assembly of a dishwasher, which can prevent a drain hose connected to a drain pump from being disconnected or damaged by outer impact.

BACKGROUND ART

Generally, a dishwasher is an electronic appliance that can remove waste adhered to dishes by spraying high pressure washing water and dry the dishes.

The washing water is reserved in a sump provided on a lower portion of the dishwasher. After the washing process is finished, the washing water is drained through a drain hose connected to the sump. The drain hose is securely connected to the sump not to be separated from the sump while the dishwasher is carried. That is, when the drain hose is disconnected with the sump, the washing water may overflow to the floor.

The drain hose is connected to the sump by a drain hose fixing assembly. A typical drain hose fixing assembly includes a semi-circular body, a flange formed on a front portion of the body and having a size greater than a sectional area of the body, an upper hook formed on an upper portion of the body to prevent the fixing assembly mounted on a base from moving, and a side hook formed on a side portion of the body.

A washing motor and a heater as well as the drain hose fixing assembly are disposed on the base. The drain hose fixing assembly is inserted in the base such that the flange is oriented toward an inner side of the base and the upper hook is oriented forward an outer side of the base.

The drain hose extends into a space defined by the body. Korean Laid-Open Patent No. 10-2004-0023108 discloses such a drain hose fixing assembly, detailed description of which will be omitted herein.

In the prior drain hose fixing assembly, an upper-outer circumference of the drain hose maintains contacting the upper hook. Therefore, in the course of inserting the upper hook into the base, as a result of which the drain hose may be damaged by being depressed by the upper hook. Same results may be incurred in the course of inserting the side hook into the base.

Furthermore, since a diameter of a hole formed on the body is too small to use a variety of drain hoses different in a size and a shape.

In addition, when the side hook is inserted in the base, the side surface of the body must be bent, thereby causing excessive force is consumed for mounting or removing the fixing assembly on or from the base.

DISCLOSURE OF INVENTION

Technical Problem

The present invention has been made in an effort to solve the above described problems.

It is an object of the present invention to provide a drain hose fixing assembly of a dishwasher, which is designed to allow a variety of hoses different in a size and a shape to be used.

It is another object of the present invention to provide a drain hose fixing assembly of a dishwasher, which is designed to be easily mounted or removed from a base with less force.

It is still another object of the present invention to provide a drain hose of a dishwasher, which can prevent a drain hose from being damaged.

Technical Solution

To achieve the above objects, the present invention provides a drain hose fixing assembly of a dishwasher, comprising: a holder body provided at an outer circumference with at least one hook; and an interference preventing rib formed on an inner circumference of the holder body to prevent a drain hose from interfering with the hook.

According to another aspect of the present invention, there is provided a dishwasher comprising: a drain hose fixing assembly having a holder body provided at an end with a hook and an interference preventing rib integrally formed on an inner surface of the holder body; a base having a wall provided with a penetration hole in which the drain hose fixing assembly is inserted; a drain hose guided by the drain hose fixing assembly and inserted in the base; and a sump connected to the drain hose.

According to still another aspect of the present invention, there is provided a dishwasher comprising: a base; a drain hose fixing assembly mounted on a wall of the base, the drain hose fixing assembly having a holder body provided at an end with a hook and an hose guide formed extending from an inner circumference of the holder body; and a drain hose penetrating the hose guide, wherein the hook is distant from an outer circumference of the drain hose.

ADVANTAGEOUS EFFECTS

According to the drain hose fixing assembly of the dishwasher of the present invention, a variety of drain hoses different in a size and a shape can be used.

In addition, the fixing assembly can be easily mounted and removed on and from the base by improving a structure of the hook formed on a side portion of the drain hose fixing assembly.

Furthermore, the damage of the drain hose, which may be caused by the hook, can be prevented in the course of mounting the drain hose.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a sectional view of a dishwasher with a drain hose fixing assembly according to an embodiment of the present invention;

FIG. 2 is a front perspective view of a fixing holder for fixing a drain hose according to an embodiment of the present invention;

FIG. 3 is a rear perspective view of a fixing holder depicted in FIG. 2;

FIG. 4 is an enlarged perspective view of a base on which a fixing holder depicted in FIG. 2 is mounted;

FIG. 5 is an enlarged rear perspective view of a base on which a fixing holder depicted in FIG. 2 is mounted; and FIG. 6 is a sectional view taken along line II-II' of FIG. 4.

BEST MODE FOR CARRING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

FIG. 1 is a sectional view of a dishwasher with a drain hose fixing assembly according to an embodiment of the present invention.

Referring to FIG. 1, the inventive dishwasher includes a tub 110 defining a washing space, a door 111 installed on a front portion of the tub 110 to open and close the tub 110, and a sump 170 formed on a bottom center of the tub 110 to reserve washing water.

The dishwasher 100 further includes a washing pump 170 provided in the sump 170 to pump out the washing water with high pressure and a driving motor 190 provided under the washing pump 180 to drive the washing pump 180.

The dishwasher 100 further includes a water guide 140 for guiding the flow of the washing water pumped out by the washing pump 180, a lower nozzle 160 disposed on the sump 170 to spray the washing water, an upper nozzle 150 extending from the water guide 140 to a center of the tub 110, and a top nozzle 155 connected to an upper end of the water guide 140 to spray the washing water downward. The top nozzle 155 is mounted on a sealing of the tub 110.

The dishwasher 100 further includes an upper rack 120 mounted above the upper nozzle 150 to receive dishes and a lower rack 120 mounted above the lower nozzle 160 to receive the dishes. The dishwasher 100 further includes a drain pump (not shown) mounted on the sump 170 to drain the washing water, a drain hose 300 connected to the drain pump, and a fixing holder 200 mounted on a sidewall of the base 400 to prevent the drain hose 300 from being removed by outer force. The tub 110 and the sump 170 are disposed on the base 400. The upper rack 120 is supported by a rail provided on an inner surface of the tub 110 to be reciprocable along the rail.

The operation of the above-described dishwasher 100 will be described hereinafter.

The upper and lower racks 120 and 130 are withdrawn after the door 111 is opened. The dishes are loaded on the racks 120 and 130 and the door 111 is closed.

When electric power is applied to the dishwasher 100, the washing water is supplied from a water source to the sump 170. When a predetermined amount of the washing water is accumulated in the sump 170, the driving motor 190 is operated to allow the washing pump 180 pumps out the washing water to the lower nozzle 160 and the water guide 140.

The washing water pumped to the water guide 140 is directed to the top and upper nozzles 155 and 150. The washing water directed to the nozzles is sprayed in the tub 110 to wash the dishes loaded on the racks 120 and 130.

The top nozzle 155 sprays the washing water downward while the upper nozzle 150 sprays the washing water upward.

The lower nozzle 160 sprays the washing nozzle upward to wash the dishes loaded on the lower rack 130. The upper nozzle 150 may be provided at a bottom with a spraying hole so that the washing water can be sprayed upward and downward, thereby simultaneously wash both surfaces of the dishes.

The washing water used in the washing process and collected in the sump 170 passes through a filter (not shown) so that the foreign objects contained therein can be filtered. Then, the washing water is drained out of the dishwasher 100 along the drain hose 300 by being pumped out by the drain pump (not shown).

When the washing water is drained, clean washing water is supplied to the sump 170 through a water intake hole and sprayed through the above-described washing process to perform a rinsing process.

After the rinsing process is finished, a drying process is performed.

FIG. 2 is a front perspective view of a fixing holder for fixing a drain hose according to an embodiment of the present invention and FIG. 3 is a rear perspective view of a fixing holder depicted in FIG. 2.

Referring to FIGS. 2 and 3, the fixing holder 200 for fixing the drain hose includes an arc-shaped holder body 210, an upper hook 220 formed on an upper-rear portion of the holder body 210, and one or more supporting ribs 260 elevated from a top surface of the holder body 210 and extending rearward.

Flexible grooves 221 are formed opposite sides of the upper hook 220 so that the upper hook 220 has predetermined elastic force. A base wall insertion groove 280 is formed on a stepped portion of the upper hook 220, being distant to the supporting rib 260. The base wall insertion groove 280 is provided to receive a rear wall portion of the base 400, having a width identical to a thickness of the base 400. A rear end of the supporting rib 260 contacts an inner circumference of the base to prevent the fixing holder 200 from being removed from the base 400.

The fixing holder 200 includes a side hook 270 stepped at a predetermined height and width on a rear portion of a side-lower end thereof and an interference preventing member 230 extending from an inner circumference of the holder body 210 toward a center. An extended end of the interference preventing member 230 extends rearward.

The interference preventing rib 230 is curved at a curvature identical to that of the holder body 210 and is provided with a drain hose penetration hole 250. A hook step 240 is formed on an inner circumference of the interference preventing rib 230. The hook step 240 is inserted in a concave portion formed on an outer circumference of the drain hose 300 to prevent the drain hose 300 from being removed.

A flexible groove 271 is formed at a point distance from the side hook 270. Likewise the upper hook 220, the flexible groove 271 is provided so that the side hook 270 can be easily bent when it passes through the wall of the base and returned to an initial shape after it passes through the wall of the base. The fixing holder 200 is provided at both sides of a lower end with supporting ribs 261 that extend from the flexible groove 271 to a front end of the holder body 210. A rear wall of the base is inserted between the side hook 270 and the holder body 210. That is, the supporting ribs 260 and 261 prevent the fixing holder 220 from being removed from the base 400.

FIG. 4 is an enlarged perspective view of a base on which a fixing holder depicted in FIG. 2 is mounted and FIG. 5 is an enlarged rear perspective view of a base on which a fixing holder depicted in FIG. 2 is mounted.

Referring to FIGS. 4 and 5, the fixing holder 200 is mounted on a rear wall of the base 400. The tub 110 is disposed on the base 400 and the sump 170, the washing motor 190 and the drain motor are received in the base 400.

The mounting position of the fixing holder 200 is not limited to the rear wall of the base 400. That is, the fixing holder 200 may be mounted on a sidewall of the base 400. The fixing holder 200 may be mounted on a portion of the base 400, which is proximal to the drain pump connected to the drain hose 300 to minimize a length of the drain hose 300.

The base 400 is provided at the rear wall with an insertion hole in which the fixing holder 200 is inserted and with seating grooves 410 to guide a lower end of the holder body 210 of the fixing holder 200.

A hose supporting projection 420 is formed between the holder seating grooves 410. An upper portion of the hose supporting projection 420 is concaved with a predetermined curvature so that the drain hose 300 can be tightly inserted into the drain hose penetration hole 250.

In order to insert the fixing holder 200 in the rear wall of the base 400, the upper and side hooks 220 and 270 are inserted through the wall of the base 400 until a snap sound is generated. Then, the fixing holder 200 is tightly fixed on the rear wall of the base 400, thereby preventing the fixing holder 200 from moving from the base 400.

FIG. 6 is a sectional view taken along line II-II' of FIG. 4.

Referring to FIG. 6, the fixing holder 200 is securely fixed on the base 400 by the upper and side hooks 220 and 270. The rear wall of the base 400 is inserted in the base wall insertion groove 280 formed between the supporting rib 260 and the upper hook 220. Then, the rear wall of the base 400 is inserted between the supporting rib 261 formed on the fixing holder 200 and the side hook 270.

Since the upper and side hooks 220 and 270 are distant from the drain hose penetration hole 250, the damage of the drain hose 300 by the hooks 220 and 270 can be prevented. By the hook steps 240 formed on the inner circumference of the interference preventing rib 230, the removal or movement of the drain hose can be prevented.

By the flexible grooves 221 and 271 that are respectively formed on the upper and side hooks 270, the hooks 220 and 270 are designed to have predetermined elastic force. Therefore, the fixing holder 200 can be easily inserted into the base 400 and the damage of the holder body 210 during insertion of the fixing holder 200 into the base 400 can be prevented.

INDUSTRIAL APPLICABILITY

Since the fixing assembly can be easily mounted on the base and the removal of the drain hose from the sump can be prevented, the present invention can be applied to the dishwasher field.

The invention claimed is:

1. A drain hose fixing assembly of a dishwasher for accommodating a drain hose, comprising:
   a holder body formed with a predetermined curvature and provided with at least one hook being protruded from an outer circumference of the holder body outwardly; and
   an interference preventing rib including a first portion extending from an inner circumference of the holder body toward a center and a second portion extending from the first portion rearward such that the hook does not contact the drain hose; and
   a drain hose penetration hole formed at an inner side of the second portion, the drain hose penetration hole receiving the drain hose.

2. The drain hose fixing assembly according to claim 1, wherein the hook is formed on an upper portion of the holder body.

3. The drain hose fixing assembly according to claim 1, wherein the hook is formed on a side portion of the holder body.

4. The drain hose fixing assembly according to claim 1, further comprising a flexible groove providing predetermined elastic force to the hook.

5. The drain hose fixing assembly according to claim 1, further comprising a supporting rib extending from an outer circumference of the holder body.

6. The drain hose fixing assembly according to claim 1, wherein the second portion is provided with at least one hook step for preventing the drain hose from moving.

7. The drain hose fixing assembly according to claim 1, wherein the interference preventing rib is designed having a curvature identical to that of the holder body.

8. A dishwasher comprising:
   a drain hose fixing assembly for accommodating a drain hose, the fixing assembly having a holder body provided with at least one hook protruding outwardly from an outer circumference of the holder body;
   an interference preventing rib including a first portion extending from an inner circumference of the holder body toward a center and a second portion extending from the first portion rearward such that the hook does not contact the drain hose;
   a base having a wall provided with a penetration hole in which the drain hose fixing assembly is inserted, wherein the hook supports the outer side of the wall, and the drain hose is guided by the drain house fixing assembly inserted in the base;
   at least one supporting rib elevated from the holder body and extending rearward, the supporting rib contacting an inner surface of the wall to prevent the fixing holder from being removed from the base; and
   a sump connected to the drain hose.

9. The dishwasher according to claim 8, further comprising a base wall insertion groove formed between the supporting rib and the hook, wherein the wall is inserted into the base wall insertion groove.

10. The dishwasher according to claim 8, wherein the supporting rib is formed on an upper and/or side surface of the holder body.

11. The dishwasher according to claim 9, wherein the drain hose fixing assembly is provided at an inner circumference with a plurality of convex and concave portions for suppressing the movement of the drain hose.

12. The dishwasher according to claim 8, the holder body and the interference preventing rib are formed in an arc-shape.

13. The dishwasher according to claim 8, wherein a guide groove is formed on a lower end of the penetrating hole of the base to guide the insertion of the drain hose fixing assembly.

14. The dishwasher according to claim 8, wherein a drain hose supporting projection is formed on a lower end of the penetration hole of the base to guide the insertion of the drain hose fixing assembly.

15. The dishwasher according to claim 14, wherein an upper surface of the drain hose supporting projection is concaved with a predetermined curvature.

16. The dishwasher according to claim 8, wherein the drain hose fixing assembly is inserted from an inner side to an outer side of the base.

17. The dishwasher according to claim 8, wherein the drain hose fixing assembly is mounted on one of rear and side walls of the base.

18. The dishwasher according to claim 8, wherein a side surface of the hook is cut to have predetermined elastic force.

\* \* \* \* \*